R. B. SPIKES.
TROLLEY POLE ARRESTER.
APPLICATION FILED DEC. 2, 1919.
1,362,197.
Patented Dec. 14, 1920.
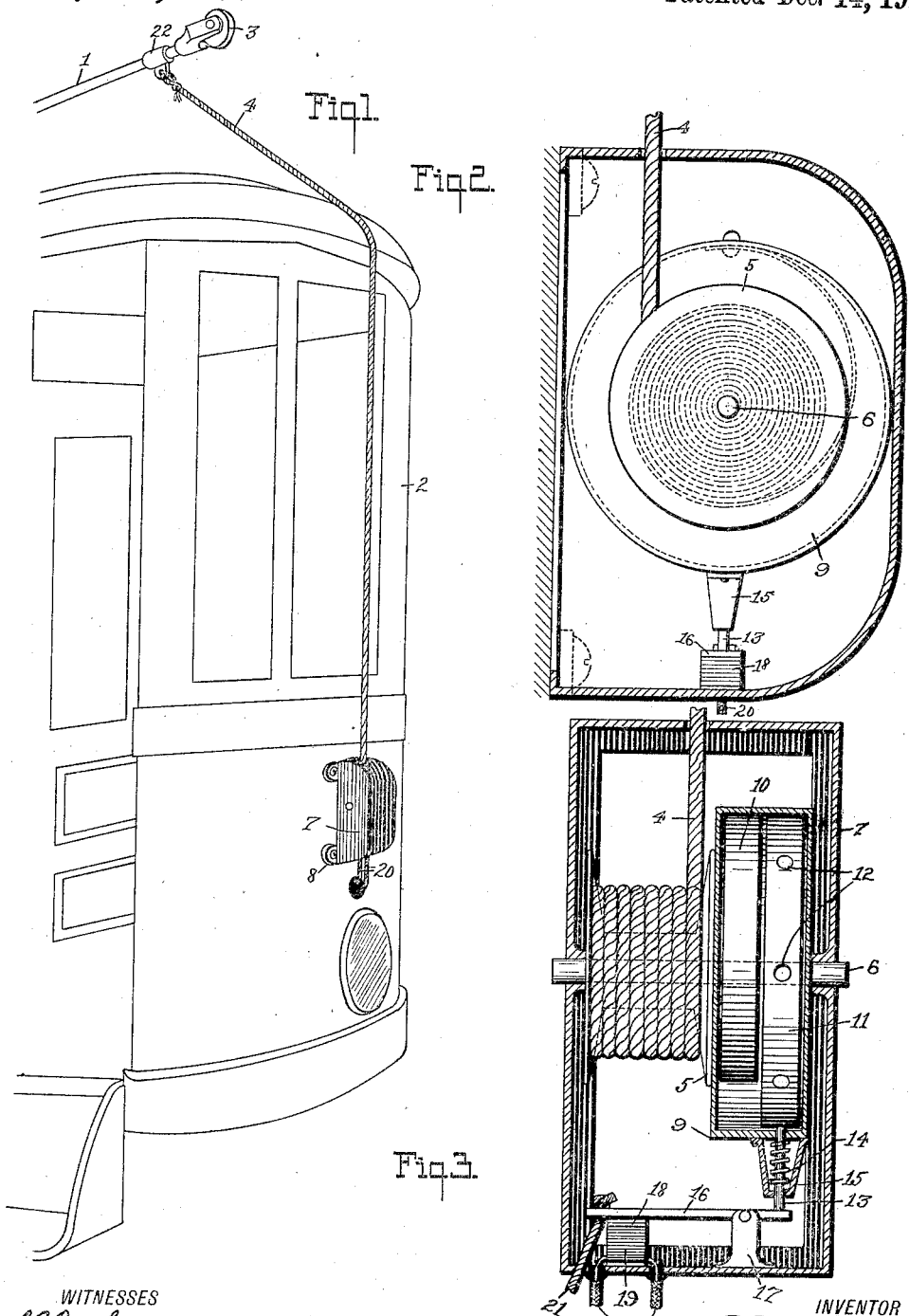
WITNESSES
INVENTOR
R. B. Spikes.
BY
ATTORNEYS

UNITED STATES PATENT OFFICE.

RICHARD BOWIE SPIKES, OF FORT BRAGG, CALIFORNIA.

TROLLEY-POLE ARRESTER.

1,362,197.  Specification of Letters Patent.  Patented Dec. 14, 1920.

Application filed December 2, 1919. Serial No. 341,996.

*To all whom it may concern:*

Be it known that I, RICHARD BOWIE SPIKES, a citizen of the United States, and a resident of Fort Bragg, in the county of Mendocino and State of California, have invented certain new and useful Improvements in Trolley-Pole Arresters, of which the following is a specification.

My invention is an improvement in trolley pole arresters, and has for its object to provide mechanism in connection with trolley poles for automatically pulling down the pole when the circuit is broken to prevent the breaking of the trolley wire and injury to the pole.

In the drawings:

Figure 1 is a perspective view of one end of a trolley car having the improved mechanism;

Fig. 2 is a vertical section through the housing for the reel;

Fig. 3 is a section at right angles to Fig. 2.

The present embodiment of the invention is shown in connection with the trolley pole 1 of a car 2 of ordinary construction, the pole having connected therewith near the wheel 3 one end of a rope 4, the other end of which winds upon a reel 5 secured to a shaft 6, which is journaled in a housing 7.

This housing has ears 8 by means of which it may be secured to the car, and the shaft 6 carries an auxiliary casing 9, in which is arranged a spring 10. This spring has one end secured to the shaft 6 and the other end fixed, and it is so arranged that the spring acts normally to turn the reel in a direction to wind up the rope 4.

The rope passes through an opening in the top of the casing, and the spring is strong enough to wind up the rope against the resistance of the pole. A disk 11 is secured to the shaft within the auxiliary casing 9 and this disk has radial recesses 12 in its peripheral surface, which are adapted to be engaged by the rounded end of a pin 13, which is normally held out of engagement with the openings of the disk.

The pin is arranged within a guide 15 secured to the auxiliary casing, and the pin rests at its lower end on one end of a lever 16. This lever is pivoted intermediate its ends to a bracket 17 in the housing, and the other end is provided with an armature 18 coöperating with an electro-magnet 19 supported in the casing.

The windings of the magnet 19 are interposed in a circuit indicated at 20, which is supplied with current from the trolley wire through the trolley pole. The spring 14 normally holds the pin 13 out of engagement with the recesses 12, but when the coil of the magnet is energized and the lever is in contact therewith, the pin will be held in engagement with one of the openings of the disk. The magnet is not powerful enough to draw the lever downwardly against the resistance of the spring 14, and it must be drawn down manually when it is desired to engage the pin 13 with one of the openings 12.

When down, however, and with the coil energized, it will be so held as long as current flows through the circuit 20. A cord, indicated at 21, is connected with that end of the lever 16 remote from the pin for permitting said lever to be drawn down into contact with the core of the magnet. The spring 14 is arranged between the auxiliary housing 9 and a stop on the pin, and the recesses 12 are rounded to fit the rounded end of the pin.

In operation, with the parts in the position shown, when the trolley jumps the wire, the current is cut off through the circuit 20 and the magnet 19 is deënergized. The spring 14 immediately pushes the pin 13 downwardly, releasing the disk 11 and permitting the spring 10 to function. The spring rotates the shaft 6 and the rope 4 is wound up to pull down the trolley pole, so that it will not break the wire.

In order to replace the trolley pole the cable must be pulled out, and this rewinds the spring 10. When the trolley wheel is placed on the wire enough cable is pulled out to allow the free movement of the trolley pole. Then with one hand the lever 16 is pulled down against the magnet and the pin is pushed into engagement with the disk, holding the parts in such position until the circuit is again broken.

Preferably, the cord 21 connected with the lever 16 is run through the car like the bell rope in order that the conductor may have access thereto at any part of the car. This is desirable in order that the magnet may be prevented from releasing the lever in crossing breaks and dead places in the conducting wire. Near the edges of the trolley pole there is placed about three inches of insulation, as shown at 22 in Fig. 1.

I claim:

1. In a trolley car, the combination with the pole, of a reel and a cord connected at one end to the pole and winding at the other end on the reel, a shaft to which the reel is secured, a casing coaxial with the shaft at one end of the reel and in which the shaft is journaled, a spring within the casing and connected to the casing and the shaft and acting normally to turn the shaft in a direction to wind up the rope, a disk secured to the shaft and having radial, peripheral openings, a pin mounted to move radially of the case and adapted to engage one of the openings of the disk, a spring normally pressing the pin outward into release position, a lever pivoted intermediate its ends and engaging at one end the pin, and a magnet coöperating with the other end of the lever and interposed in the trolley circuit for holding the latch pin in engagement with the disk.

2. In a trolley car, the combination with the pole, of means normally operated for pulling the pole down into inoperative position, a spring-controlled latch-pin for restraining the operation of the said pole-pulling-down means, a magnet in circuit with the current derived from the trolley wire through the pole, a lever pivoted intermediate its ends and having one end coöperating with the magnet as an armature, the other end of the lever engaging the pin to press it into inoperative position against the resistance of the spring when the armature is energized and a flexible member connected with the lever for permitting the same to be manually operated.

RICHARD BOWIE SPIKES.